United States Patent
Hillyard (10) Patent No.: US 8,611,818 B2
(45) Date of Patent: *Dec. 17, 2013

(54) MECHANISM FOR IMPROVED INTEROPERABILITY WHEN CONTENT PROTECTION IS USED WITH AN AUDIO STREAM

(75) Inventor: Jason Hillyard, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 928 days.

This patent is subject to a terminal disclaimer.

(21) Appl. No.: 12/338,927

(22) Filed: Dec. 18, 2008

(65) Prior Publication Data

US 2009/0176452 A1 Jul. 9, 2009

Related U.S. Application Data

(63) Continuation of application No. 11/075,052, filed on Mar. 8, 2005.

(51) Int. Cl.
*H04B 7/00* (2006.01)

(52) U.S. Cl.
USPC ........................... 455/41.2; 455/41.1

(58) Field of Classification Search
USPC ............................. 455/41.2, 575.2
See application file for complete search history.

(56) References Cited

U.S. PATENT DOCUMENTS

| 7,684,826 B2 * | 3/2010 | Champion et al. ............ 455/557 |
| 2002/0066018 A1 | 5/2002 | Linnartz |
| 2002/0183005 A1 * | 12/2002 | Yl et al. ........................ 455/41 |
| 2003/0221100 A1 * | 11/2003 | Russ et al. ..................... 713/153 |
| 2004/0042413 A1 * | 3/2004 | Kawamura et al. ........... 370/252 |
| 2004/0248615 A1 * | 12/2004 | Purkayastha et al. ...... 455/552.1 |
| 2004/0259499 A1 * | 12/2004 | Oba et al. ..................... 455/41.2 |
| 2005/0055453 A1 * | 3/2005 | Zhu ................................ 709/230 |
| 2005/0097408 A1 * | 5/2005 | Palin et al. .................... 714/700 |
| 2005/0160450 A1 * | 7/2005 | Stephens et al. ................ 725/35 |
| 2005/0190916 A1 * | 9/2005 | Sedacca ........................ 380/239 |
| 2005/0226152 A1 * | 10/2005 | Stephens et al. .............. 370/230 |
| 2005/0240985 A1 * | 10/2005 | Alkove et al. ..................... 726/1 |
| 2006/0092951 A1 * | 5/2006 | Peak et al. .................... 370/397 |
| 2006/0095638 A1 * | 5/2006 | Unger .......................... 710/310 |
| 2006/0136702 A1 * | 6/2006 | Vantalon et al. .................. 713/1 |
| 2006/0167975 A1 * | 7/2006 | Chan et al. .................... 709/203 |

(Continued)

OTHER PUBLICATIONS

Specification of the Bluetooth System, Profiles, Specification vol. 2, v1.0 B, dated Dec. 1, 1999, 440 pages.

*Primary Examiner* — Hai V Nguyen
(74) *Attorney, Agent, or Firm* — Thomas|Horstemeyer, LLP (57) ABSTRACT

A method and system that configure communication between devices in a network utilizing bluetooth technology, where one device may or may not support content protection, and another device may or may not support content protection. A first device may utilize a configuration that enables data communication via a bluetooth communication link with a second device based on whether the second device supports content protection. The content protected data communicated between the devices is based on the first device configuration. If the second device does not support content protection, the first device may utilize a configuration that does not require content protection for communicating data with the second device. If the second device supports content protection, the first device may utilize a configuration that requires content protection for communicating data. If data communication utilizing content protection fails, one or both of the devices may revert to a configuration that does not require content protection.

18 Claims, 9 Drawing Sheets

(56) References Cited

U.S. PATENT DOCUMENTS

| | | | |
|---|---|---|---|
| 2006/0198359 A1* | 9/2006 | Fok et al. | 370/351 |
| 2006/0218598 A1* | 9/2006 | Casey et al. | 725/86 |
| 2007/0130254 A1* | 6/2007 | Russ et al. | 709/203 |
| 2007/0162981 A1* | 7/2007 | Morioka et al. | 726/30 |
| 2009/0171851 A1* | 7/2009 | Beenau et al. | 705/72 |
| 2009/0204805 A1* | 8/2009 | Robba et al. | 713/153 |

\* cited by examiner

MECHANISM FOR IMPROVED INTEROPERABILITY WHEN CONTENT PROTECTION IS USED WITH AN AUDIO STREAM

RELATED APPLICATIONS

This application is a continuation of U.S. patent application Ser. No. 11/075,052 filed on Mar. 8, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers, with more products coming out every day.

The Bluetooth® specification defines protocols and profiles to build wireless audio streaming devices such as wireless headphones. These specifications are designed to accommodate the use of content protection mechanisms such that the audio content is encrypted when transferred between the two devices.

Content protection is optional and the Bluetooth® specifications give little guidance on how it should be used. Therefore it is likely that there will be products that do not use content protection while others do. This presents an interoperability dilemma: what to do if one device uses content protection and the other does not? Simply not allowing the connection may be too strict and may not be acceptable to users. However allowing the connection would completely circumvent the content protection.

Further limitations and disadvantages of conventional and traditional approaches will become apparent to one of skill in the arts through comparison of such systems with some aspects of the present invention as set forth in the remainder of the present application with reference to the drawings.

BRIEF SUMMARY OF THE INVENTION

A system and/or method for communicating information, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to facilitating data transfer between two devices over a wireless link. More specifically, certain embodiments of the present invention relate to providing a mechanism for improved interoperability between devices that use content protection when transferring an audio stream. While the following discusses aspects of the present invention in association with audio content using Bluetooth® technology, it should be understood that embodiments of the present invention may be applicable in systems utilizing other communication technologies. Additionally, aspects of the present invention may be utilized with any content such as, for example, audio, video, etc.

Various aspects of the present invention may be related to Bluetooth® technology, and more specifically to the Bluetooth® audio/video distribution transport protocol (AVDTP) and advanced audio distribution profile (A2DP) profile specifications. A more detailed description of the Bluetooth® technology is disclosed in U.S. patent application Ser. No. 11/019,072 filed Dec. 21, 2004, the complete subject matter of which is hereby incorporated herein by reference, in its entirety.

The Bluetooth® community has recently developed specifications that define how to use streaming audio over a Bluetooth® link. This opens up the technology to a whole new class of audio devices, such as wireless stereo headsets, wireless speakers, and wireless portable MP3 players just to name a few. With the introduction of new Bluetooth® specifications for streaming audio, new Bluetooth® products such as wireless stereo headsets and wireless file streaming applications are rapidly becoming a reality. The Bluetooth® streaming audio system is defined by three Bluetooth® specifications plus a number of ISO/IEC audio standards and RFC Internet standards.

Figure 1:
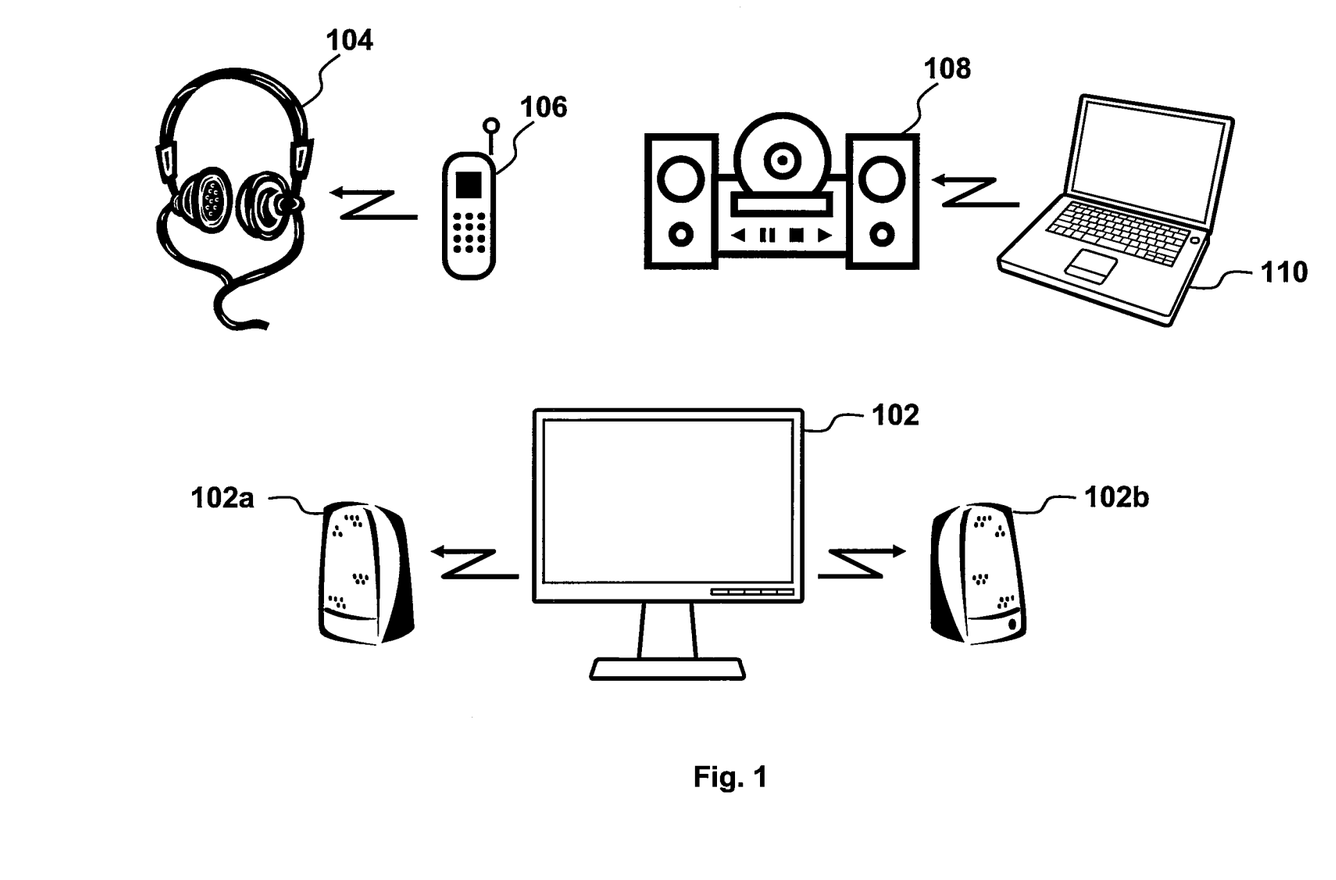
FIG. 1 illustrates a diagram of exemplary Bluetooth® (BT) streaming audio devices.

FIG. 1 illustrates a diagram of exemplary Bluetooth® (BT) streaming audio devices. Referring to FIG. 1, there is shown a stereo headset 104, a mobile phone 106, a Bluetooth®-enabled stereo system 108, personal computers (PC) 110 and 102, and stereo speakers 102a and 102b. The stereo headset 104 may receive streaming audio from MP3 files stored on the mobile phone 106. The headset 104 may also function as a normal Bluetooth® telephony headset for phone calls. The Bluetooth®-enabled stereo system 108 may receive streaming audio from MP3 files stored on the PC 110, solving the problem of how to get the MP3's from the PC 110 to the stereo system 108. The PC 102 may play stereo audio to the pair of Bluetooth® wireless speakers 102a and 102b, thus freeing the desktop from wired clutter.

Bluetooth® is a frequency hopping spread spectrum (FHSS) radio system operating in the 2.4 GHz unlicensed band. Its low power transmissions allow a typical range of about 10 meters. Devices may connect to each other to form a network known as a piconet, with up to seven active devices in the piconet. The maximum data throughput between devices is approximately 723 kilobits per second (kbps), with the data capacity shared between devices on the piconet.

Bluetooth® has a protocol stack to transfer data and implement the advanced features required by applications. The protocol stack may comprise several different protocols designed for different purposes. Various profiles, or applications, may reside above the protocol stack Bluetooth® may also comprise a lower protocol stack for link management and baseband control.

Figure 2:
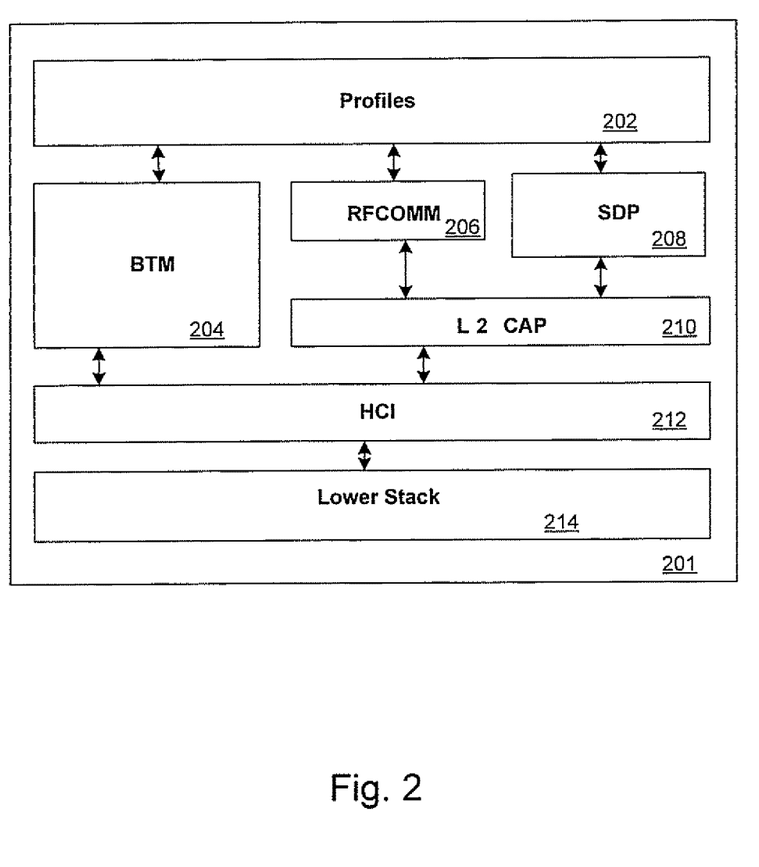
FIG. 2 illustrates a simplified exemplary protocol stack.

FIG. 2 illustrates a simplified exemplary protocol stack. Referring to FIG. 2, there is illustrated an exemplary Bluetooth® protocol stack 201. The exemplary Bluetooth® protocol stack 201 may comprise profiles protocol 202, Bluetooth® management entity (BTM) protocol 204, radio frequency communication (RFCOMM) protocol 206, service discovery protocol (SDP) 208, logical link control and adaptation protocol (L2CAP) 210, host controller interface (HCI) 212, and a lower stack 214. The profiles protocol 202 may comprise profiles of one or more applications that may be utilized in connection with the Bluetooth® protocol stack. The BTM protocol 204 makes it possible for various equipment to have wireless communication by integrating with a Bluetooth® module. The RFCOMM protocol 206 may be utilized to provide emulation of RS-232 serial ports over the L2CAP protocol. The RFCOMM protocol 206 may be utilized to emulate RS-232 control and data signals over the baseband, providing both transport capabilities for upper level services, such as OBEX, that use serial line as the transport mechanism.

The SDP 208 may be utilized for querying Bluetooth® device information, Bluetooth® device services, and characteristics of the services. The L2CAP 210 may be utilized to support higher level protocol multiplexing, packet segmentation and reassembly, and quality of service (QoS). L2CAP 210 may permit higher-level protocols and applications to transmit and receive data packets up to 64 kilobytes in length. The HCI 212 may be adapted to provide a command interface to the baseband controller, link manager, and access to hardware status and control registers.

Figure 3:
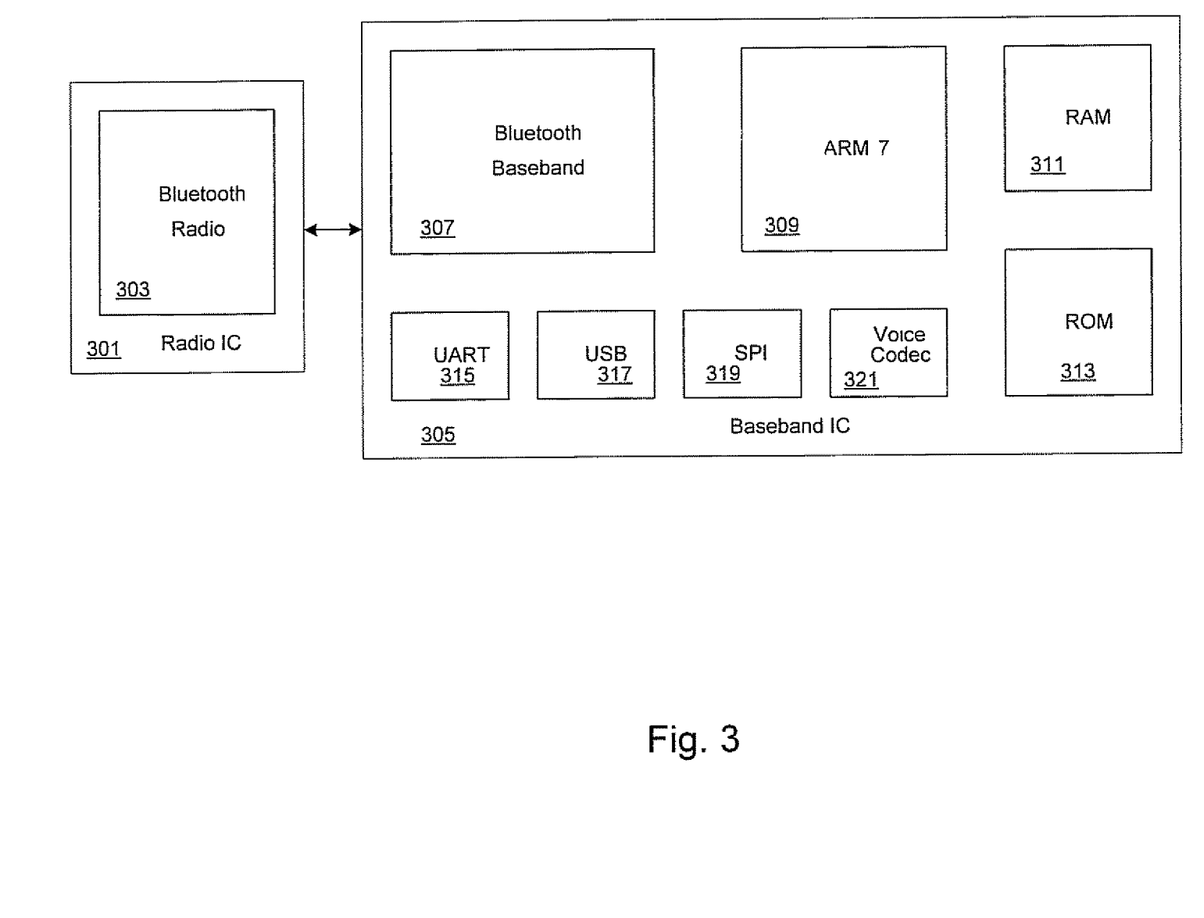
FIG. 3 illustrates a block diagram of an exemplary Bluetooth® hardware implementation.

Bluetooth® hardware implementations are typically highly integrated systems consisting of one or two chips FIG. 3 illustrates a block diagram of an exemplary Bluetooth® hardware implementation. Referring to FIG. 3, the Bluetooth® hardware implementation may comprise a Bluetooth® baseband integrated circuit (IC) 305 and a radio IC 301. The radio IC 301 may comprise a Bluetooth® radio circuit 303. The baseband IC 305 may comprise Bluetooth® baseband circuit 307, ARM7 processor 309, random access memory (RAM) 311, read only memory (ROM) 313, voice codec 321, a serial peripheral interface (SPI) 319, universal serial bus (USB) 317, and universal asynchronous receiver/transmitter (UART) 315. The radio IC 301 may be implemented in a separate chip. The ARM7 processor 309 may be adapted to operate all the required software including lower stack, upper stack, and embedded profile, for example. This type of single CPU implementation allows for a small, low power, and low cost solution.

The 723 kbps throughput of a Bluetooth® link may be suitable for streaming audio utilizing MP3 and/or other codec formats. Bluetooth® streaming audio may be defined by three Bluetooth® specifications covering the protocol and profiles: AVDTP, GAVDP, and A2DP. The Audio/Video Distribution Transport Protocol (AVDTP) is the protocol designed especially for Bluetooth® streaming audio and video. It may perform the signaling to configure, open, and/or close a stream between two devices, A/V stream data may be transferred utilizing real-time protocol (RTP) packets. AVDTP sits in the protocol stack above L2CAP and may utilize separate L2CAP channels for signaling and data. The Generic Audio/Video Distribution Profile (GAVDP) is an abstract profile that defines how applications can use AVDTP. The Advanced Audio Distribution Profile (A2DP) defines how Bluetooth® streaming audio applications work. It defines how to get and set audio codec parameters for MPEG and/or other codecs. The A2DP may also define the media payload formats for packaging audio stream data into packets and may contain the specification for a new audio codec called SBC (sub-band codec).

When two devices, which may comply with the A2DP, wish to start streaming of audio content, the devices may first set up a streaming connection. During such a set up procedure, the devices may select the most suitable audio streaming parameters. Configured services may be, for example, an application service capability or a transport service capability.

The application service capability may consist of, for example, audio codec capability and content protection capability Codec parameters may be, for example, sampling frequency, channel mode, block length, subbands, allocation method, minimum and maximum bitpool values, etc. The minimum and maximum bitpool values may indicate the range of the bitpool value in the ACP. Using the bitpool value and other codec parameters such as, for example, sampling frequency, channel mode, block length, and the number of subbands, the bit rate and frame length of the audio stream may be calculated as shown below:

--- bit_rate = 8 * frame_length * $f_s$ / nrof_subbands / nrof_blocks, frame_length = 4 + (4 * nrof_subbands * nrof_channels) / 8 + [nrof_blocks * nrof_channels * bitpool / 8], for the Mono and Dual_Channel channel modes, and frame_length = 4 + (4 * nrof_subbands * nrof_channels) / 8 + [join * nrof_subbands * nrof_blocks * bitpool / 8], for the Stereo and Joint_Stereo channel modes,

--- where $f_s$, nrof_subbands, nrof_blocks, nrof_channels, and bitpool denote sampling frequency, number of subbands, number of blocks, number of channels, and bitpool value, respectively. When joint stereo is used, join=1, otherwise 0.

The transport service capability may manipulate the streaming packets more intelligently. Transport service capability may include services such as, for example, basic service, reporting service, recovery service, multiplexing service, and robust header compression service.

Once the devices establish a streaming connection, the source device, which is the device acting as a source of a digital audio stream, and the sink device, which is the device acting as a sink of a digital audio stream, may be ready to send and receive audio stream, respectively. The source device may employ a "send audio stream" procedure to send audio data to the sick device, which may employ a "receive audio stream" procedure to receive the audio data. In the "send audio stream" procedure, the source device may encode the audio data into a selected format that may be compatible with the decoding capabilities in the sink device. When content protection is used, a content protection header may precede the encrypted audio content. The audio data stream may then be sent out on a transport channel using a selected transport service in the AVDTP entity in the source device. The AVDTP entity of the sink device may then receive the audio data stream from the transport channel using a selected transport service. If content protection is used, the sink device may process the content protection header to analyze it and decrypt associated encrypted content. The audio data may then be decoded according to the selected coding format.

Figure 4:
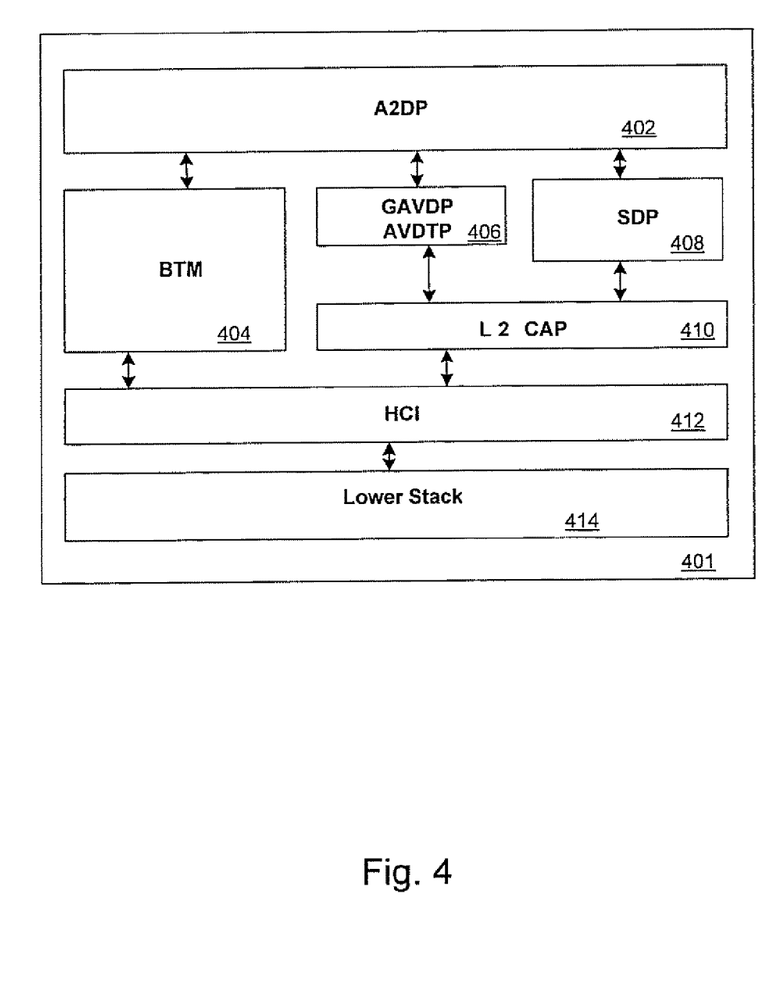
FIG. 4 illustrates a block diagram of a Bluetooth® protocol stack for streaming audio.

FIG. 4 illustrates a block diagram of a Bluetooth® protocol stack for streaming audio. Referring to FIG. 4, the Bluetooth® protocol stack for streaming audio 401 may comprise A2DP 402, Bluetooth® management entity (BTM) protocol 404, GAVDP/AVDTP 406, service discovery protocol (SDP) 408, logical link control and adaptation protocol (L2CAP) 410, host controller interface (HCI) 412, and a lower stack 414. In addition to the Bluetooth® specifications illustrated on FIG. 4, there are several ISO/IEC and Internet RFC specifications used for Bluetooth® streaming audio, which are summarized in Table 1.

TABLE 1

Additional Specifications Used for Bluetooth ® Streaming Audio

| Specification | Description |
|---|---|
| ISO/IEC 11172 part 3 | MPEG audio |
| ISO/IEC 13818 part 3 | MPEG audio |
| ISO/IEC 13818 part 7 | MPEG advanced audio |
| ISO/IEC 14496 part 3 | MPEG advanced audio |
| RFC 1889 | Real-time protocol (RTP) |
| RFC 2733 | RTP error correction |
| RFC 3095 | Packet header compression |
| RFC 2250 | RTP payload format |
| RFC 3016 | RTP payload format |
| RFC 3119 | RTP payload format |

Figure 5:
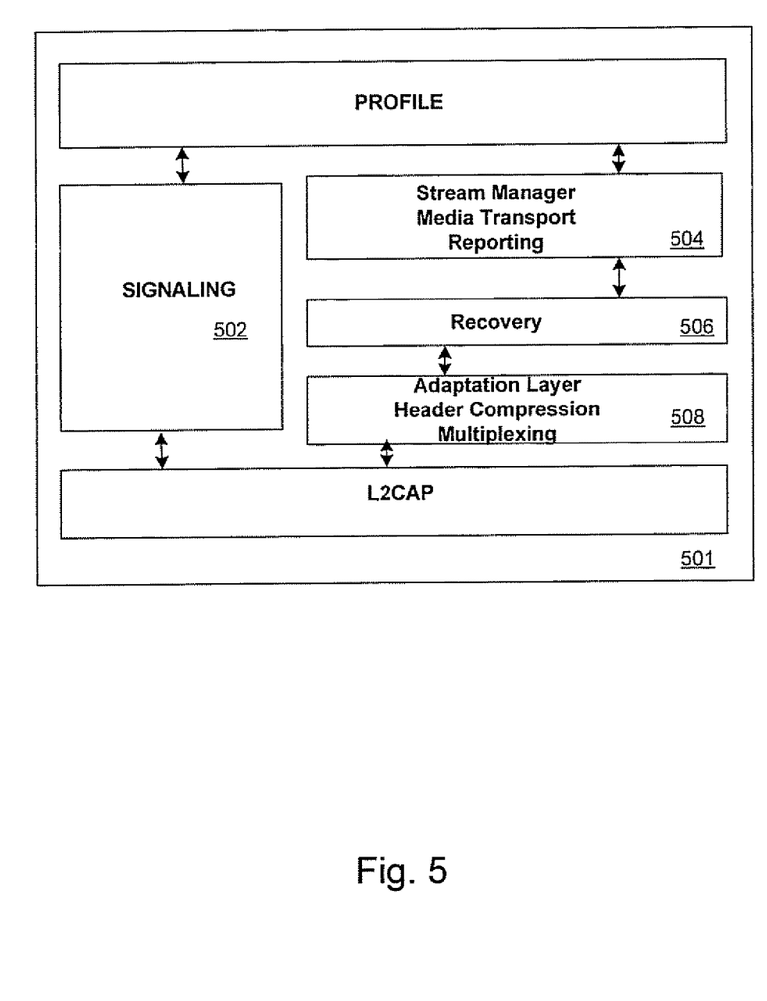
FIG. 5 illustrates a block diagram of AVDTP protocol features.

The bulk of the Bluetooth® streaming A/V system may be implemented in the AVDTP protocol. FIG. 5 illustrates a block diagram of AVDTP protocol features. Referring to FIG. 5, the AVDTP protocol may comprise a portion of the Bluetooth® protocol stack 501 and may be divided into four subsystems: signaling 502, stream management 504, recovery 506, and adaptation layer 508. AVDTP signaling messages 502 are used to discover, configure, open, and close a stream between two devices. There are eleven message types with some messages being optional.

A media transport feature of the stream manager 504 may be utilized to transfer RTP packets containing audio data. This feature is a required feature of AVDTP. The reporting feature of the stream manager 504 may allow link quality information, such as jitter and packet loss, to be exchanged utilizing the protocols defined in RFC 1889. This is an optional feature. The recovery feature 506 adds extra packets containing error correction data to the packet transfer. This feature may allow for lost packets to be recovered. The recovery mechanism is defined by RFC 2733. This is an optional feature and may require additional ROM and/or RAM.

A header compression feature of the adaptation layer 508 allows the RTP header to be compressed, as defined by RFC 3095. When used with AVDTP, the RTP header may be reduced by 5 to 7 bytes. This savings may probably not be worth the effort of implementing the feature especially when large media packets are used. A multiplexing feature of the AVDTP adaptation layer 508 allows L2CAP channels to be shared by media, reporting, and/or recovery packets, therefore resulting in fewer L2CAP channels and better baseband channel capacity utilization. This complex feature may be useful for devices that use multiple simultaneous streams with reporting and recovery.

A device implementing Bluetooth® streaming audio may need to consider several issues, which are not fully covered by the Bluetooth® specifications. Such issues may be related to implementation of optional features, multiple streams support, and/or data flow and synchronization issues, for example. One or more of these issues may be beyond the scope of the Bluetooth® specification.

Figure 6:
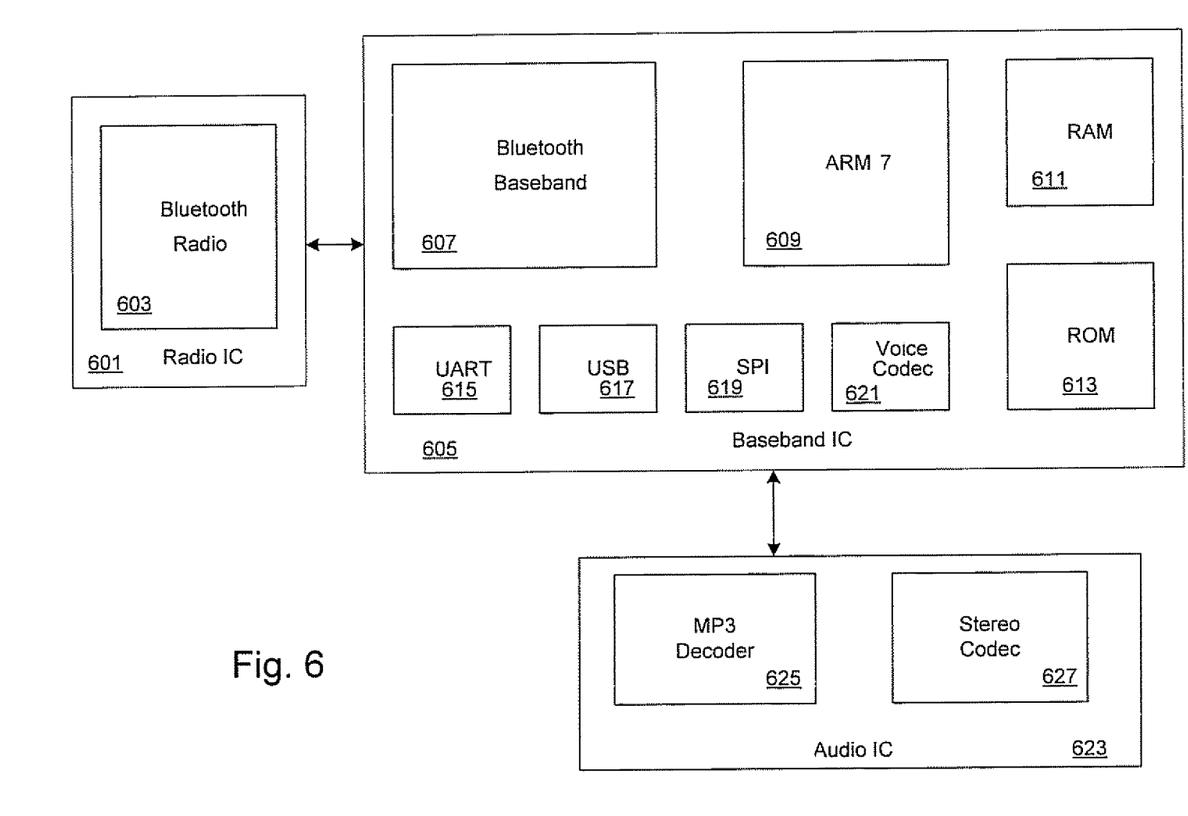
FIG. 6 illustrates an exemplary hardware implementation for streaming audio playback.

FIG. 6 illustrates an exemplary hardware implementation for streaming audio playback. Referring to FIG. 6, the Bluetooth® hardware implementation for streaming audio playback may comprise a Bluetooth® baseband integrated circuit (IC) 605, a radio IC 601, and an audio IC 623. The radio IC 601 may comprise a Bluetooth® radio circuit 603. The audio IC 623 may comprise an MP3 decoder 625 and a stereo codec circuit 627. The baseband IC 605 may comprise Bluetooth® baseband circuit 607, ARM7 processor 609, random access memory (RAM) 611, read only memory (ROM) 613, voice codec 621, a serial peripheral interface (SPI) 619, universal serial bus (USB) 617, and universal asynchronous receiver/transmitter (UART) 615. The radio IC 601 and the audio IC 623 may be implemented in separate chips. The ARM7 processor 609 may be adapted to operate all the required software including lower stack, upper stack, and embedded profile, for example. Data received over the Bluetooth® link may be processed by the protocol stack and passed to an application. The application may acquire the audio stream data and may communicate it over a hardware interface to the audio IC 623. The audio IC 623 may decode the digital audio and may convert the audio signal to analog signal.

Implementing AVDTP with the minimum required features may require multiple streams support. For the simple streaming audio device examples shown in FIG. 1, optional features such as recovery, reporting, header compression, and multiplexing may not be required as Bluetooth® devices may be adapted to perform adequately without such features.

Maintaining a data transfer with a constant bit rate on a Bluetooth® link may be difficult to achieve. If data is sent too slowly, the audio decoder may run out of stream data to process, causing an audible error. Lost data packets may also cause the same problem. On the other hand, if data is sent too quickly, then data may be buffered up at the audio decoder, eventually causing congestion or data loss when the device runs out of buffer space. Since there is no flow control mechanism built into AVDTP or L2CAP, other mechanisms may be utilized to prevent data loss. The mechanism used by the audio source, or device sending the stream, may depend on the type of source. If the source is "live" and audio stream data is provided by an audio encoder, then the encoder itself may provide the constant bit rate. If the source is from a file, then a timer may be utilized to maintain a constant bit rate.

Tables 2a and 2b illustrate various exemplary relationships between audio frame size, data rate, sample frequency and frame period. Based on these tables, an appropriate timer value may be utilized to handle the sending of audio packets. In an exemplary embodiment of the present invention, consider a device is sending an MP3 stream from a file encoded at 128 kbps and 48 kHz sample frequency. Referring to Table 2a, this means an MP3 audio frame 384 bytes long is sent every 24.0 ms. If the device simply sets a periodic timer for 24.0 ms and sends a packet every time the timer expires, the constant bit rate will be maintained. In another exemplary embodiment of the invention, consider a device sending a SBC formatted audio stream encoded at 128 kbps having a sampled frequency of 48 kHz. With reference to Tables 2a and 2b, a SBC formatted audio frame 42 bytes long may be sent every 2.667 ms. Accordingly, a source may be configured so that every time a 2.667 ins timer expires, a 42 byte frame may be sent. In this regard, a constant bit rate may be maintained during transmission.

TABLE 2a

Audio Frame Sizes for SBC and MP3
Audio Frame Size vs. Data Rate and Sample Frequency

| | SBC | | | MP3 | | |
| --- | --- | --- | --- | --- | --- | --- |
| | 64 kbps | 128 kbps | 320 kbps | 64 kbps | 128 kbps | 320 kbps |
| 48 kHz | 20 | 42 | 108 | 192 | 384 | 960 |
| 44.1 kHz | 22 | 46 | 118 | 209 | 418 | 1045 |
| 32 kHz | 32 | 64 | 162 | 228 | 576 | 1440 |

TABLE 2b

Audio Frame Periods for SBC and MP3
Audio Frame Period vs. Sample Frequency

| | SBC | MP3 |
| --- | --- | --- |
| 48 kHz | 2.667 ms | 24.0 ms |
| 44.1 kHz | 2.902 ms | 26.122 ms |
| 32 kHz | 4.0 ms | 36.0 ms |

SBC frames may be small with a short period, as illustrated in Table 2b, shown above, with regard to several typical values for SBC and MP3 audio frame periods. Some devices may have problems using timers or processing data at such short intervals. Accordingly, rather than send a small packet containing a single frame at very short intervals, a larger packet containing several frames at longer intervals may be communicated instead. The maximum size of MP3 flames may correspond to the L2CAP MTU of the AVDTP transport channel, such that audio frames may not need to be fragmented across AVDTP packets.

Consider an example, in which a packet is sent every 24 ms. Consider what happens if the timer isn't so accurate and the packet actually gets sent at 20 ms or 29 ms. If a packet arrives late, the audio decoder may run out of data. Therefore, even a slight inaccuracy may cause malfunction if every packet is expected to be sent on time. To prevent such malfunction, a slack may be provided in the data flow. Assuming the device receiving the stream is adapted to buffer up at least a few packets, a number of packets may be communicated as fast as possible when streaming starts. This helps with timer inaccuracy and data delayed by lost packets as well. The amount of packets that may be buffered may depend on the specific implementation of the device receiving the stream. The device receiving the stream may also improve the data flow. Regardless of how fast or slow the peer is sending the stream, the device receiving the stream can smooth out the flow by delaying playback until a number of packets have been received. This helps with timer inaccuracy and data delayed by lost packets.

When more than one stream is transferred between devices, the stream playback may be synchronized. Consider the example of the wireless PC speakers shown in FIG. 1. The PC may communicate a Bluetooth® audio stream to each speaker. There are actually two synchronization problems in this example. First, the audio playback of the two speakers may need to be synchronized with each other. Second, the audio playback may need to be synchronized with the display on the PC. Although the Bluetooth® specifications do not cover synchronization issues, there are some features of the system that may be utilized to address these synchronization problems.

Every Bluetooth® device has a free-running system clock, which determines the timing of the frequency-hopping transceiver. In a piconet, the slave devices are synchronized to the master's system clock. The speakers may both be synchronized to the Bluetooth® clock timing of the PC. Depending on the implementation of the Bluetooth® chip, it may be possible for an application to derive a timer based on the PC clock. The PC clock may be utilized in conjunction with the RTP presentation timestamp in the packet to synchronize the playback. Therefore, it may be possible to utilize the piconet timing as a synchronization source between the two speakers.

The second part of the synchronization problem boils down to how much delay is present from when the PC sends the audio stream to when the speakers play it back. Studies show that a delay larger than 80 ms may be noticeable in situations like this. As discussed earlier, however, it may be desirable for the device receiving a stream to buffer up a few audio frames before playback to help maintain a constant data rate on the link. This 80 ms limit may be an upper bound of how many frames to buffer. For example, an MP3 stream sampled at 44.1 kHz has a frame period of 26.122 ms, Therefore; no more than three frames may be buffered to keep delay under the timing corresponding to the limit.

In an embodiment of the present invention, two devices may have audio streaming transfer back and forth between them, and one of the devices may or may not be designed with the use of content protection. In this regard, the quality of the audio may be adjusted, such that it may be mediocre by allowing the connection to circumvent the content protection. In some instances, both devices may support content protection, and as a result, high quality audio may be used. Notwithstanding, regardless of whether or not content protection is utilized, devices may still possess the capability to connect and a user may be permitted to hear at least a limited version of audio content.

The quality of a digital audio stream may be adjusted by setting the stream rate of the audio encoder, where higher stream rates may result in better audio quality. Other parameters may be also adjusted, depending on the particular codec being used.

Aspects of the present invention may be applicable to codecs that allow different quality encoding on the fly such as, for example, MP3 or SBC. In this regard, the audio quality may be adjusted through the stream rate, which may be set to, for example, a high stream rate or a low stream rate, where a high stream rate may provide better quality audio. For example, content such as music may be of better quality at a high stream rate such as, for example, 200 kbits/second, and without content protection, a lower stream rate such as, for example, 128 kbits/second. If the content is speech an even lower stream rate such as, for example, 80 kbits/second may be used. The audio quality may also be adjusted with other codec parameters such as, for example, mode, which may be mono or stereo.

For SBC, for example, parameters such as the number of blocks, number of subbands, loudness or SNR (signal-to-noise ratio), and bitpool may affect audio quality. The number of blocks refers to the number of audio samples used to encode a particular frame of audio. The number of subbands refers to number of chunks of an audio sample divided according to bands of frequencies. The number of blocks and number of sub-bands may affect how the audio signal is apportioned into chunks when it is encoded. For example, using more subbands may indicate dividing the audio signal into smaller, more specific chunks, and then encoding it, which may result in a better quality audio signal. Additionally, the audio stream may be optimized by utilizing an appropriate number of blocks when sampling an audio frame for encoding. Loudness or SNR may be utilized to define a metric for quantization of samples, where the choice of loudness may yield better results with music content, for example, than utilizing the SNR. Loudness and SNR may have a relationship with the amplitude of the audio signal, where loudness may indicate the amplitude of the audio signal, and SNR may indicate a relationship between the amplitude of the audio signal and the amplitude of the noise added to the audio signal.

The codec specific information elements for SBC used in the signaling procedures between the source and sink devices may be, for example, sampling frequency, channel mode, block length, subbands, allocation method, and minimum and maximum bitpool values. The sampling frequency may indicate the sampling frequency with which the audio stream has been encoded. The decoder in the sink device may support at least the sampling frequencies 44.1 kHz and 48 kHz. The encoder in the source device may support at least one of the sampling frequencies 44.1 kHz and 48 kHz. The channel mode parameter may indicate the channel mode that has been encoded. For SBC, for example, the decoder in the sink device may support all of Mono, Dual Channel, Stereo, and Joint Stereo, and the encoder in the source device may support at least Mono and one of Dual Channel, Stereo, and Joint Stereo. The block length parameter may indicate the size with which the audio stream has been encoded. For example, for SBC, the devices may support block sizes of 4, 8, 12, and 16. The subbands parameter may indicate the number of subbands with which the audio stream has been encoded. For SBC, for example, the number of subbands may be 4 or 8, the decoder in the sink device may support both, while the encoder in the source device may support 8 subbands and optionally support 4 subbands. The allocation method parameter may indicate whether the allocation method is loudness or SNR. The bitpool parameter may indicate the size of the bit allocation pool that has been used for encoding the stream. In SBC, for example, the values for the maximum and minimum bitpool values may be utilized to compute the bit rate and frame length of an audio stream as indicated hereinabove. The codec information that determines the bit rate may be contained in the SBC frame header and may be repeatedly sent to the sink device associated with the audio data stream. The source device may be capable of changing the bit rate dynamically by changing the bitpool parameter without suspending. Table 3 illustrates exemplary settings for the encoder in the source device.

TABLE 3

Exemplary sets of SBC parameters in the source device

| SBC encoder settings* | Middle Quality | | High Quality | |
|---|---|---|---|---|
| | Mono | Joint Stereo | Mono | Joint Stereo |
| Sampling frequency (kHz) | 44.1 48 | 44.1 48 | 44.1 48 | 44.1 48 |
| Bitpool value | 19 18 | 35 33 | 31 29 | 53 51 |
| Resulting frame length (bytes) | 46 44 | 83 79 | 70 66 | 119 115 |
| Resulting bit rate (kb/s) | 127 132 | 229 237 | 193 198 | 328 345 |

*Other settings: Block Length = 16, Allocation Method = loudness, Subbands = 8

The configuration of the parameters may depend on the content of the audio signal such as, for example, speech versus music. For example, for speech content, the change of mode between mono and stereo may not have as much of an effect on the quality as it may have on music content. When using the SBC the channel mode may be, for example, one of mono, dual channel, stereo, and joint stereo.

Figure 7A:
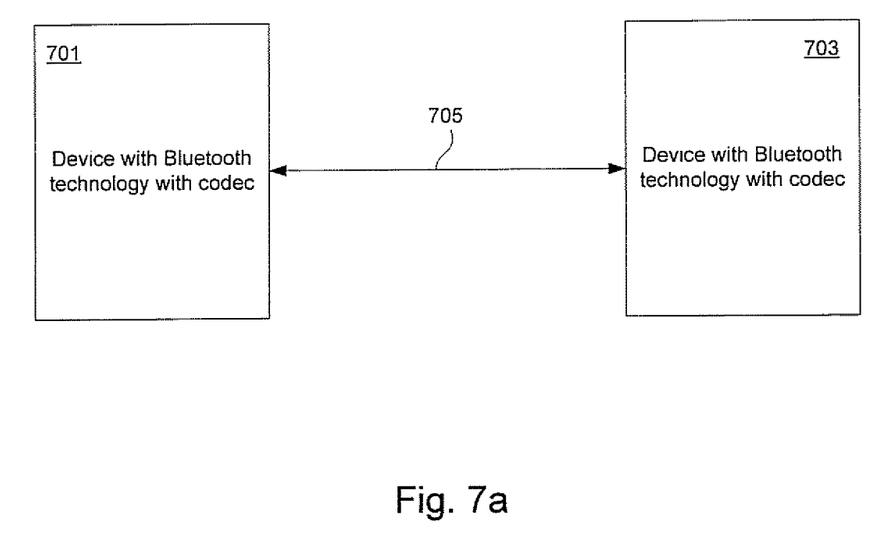
FIG. 7a illustrates a high-level block diagram of an exemplary system, in accordance with an embodiment of the present invention.

FIG. 7a illustrates a high-level block diagram of an exemplary system, in accordance with an embodiment of the present invention. The system may comprise the devices 701 and 703 that may be attempting to connect via a communication link 705. Devices 701 and 703 may be Bluetooth® streaming audio devices. The device 701 may support content protection, and the device 703 may or may not support content protection. The device 701 and 703 may be for example, devices capable of communicating data across a communication channel 705, where the data may be an audio stream, a video stream, etc. In an embodiment of the present invention, the devices 701 and 703 may be part of a network such as, for example, a personal area network.

In an embodiment of the present invention, the device 701 may support content protection and the device 703 may not support content protection. In such an embodiment, when the connection is attempted, the connection may be achieved without content protection. There may be circumstances where both devices 701 and 703 may support content protection, but the content protection may not work because, for example, the two devices 701 and 703 may have different versions of the content protection, or the key exchange for the encryption of the transferred signal may not work. In such circumstances, the content protection mechanism may fail, but connection may still be accomplished by without content protection. Communication with content protection may successfully function in both devices 701 and 703.

In an embodiment of the present invention, the codec may be configured based on whether content protection is utilized in the communication between the two devices 701 and 703. Multiple codec configurations may be utilized to ensure optimal communication conditions. AVDTP may provide for the identification and negotiation of a content protection method via procedures such as, for example, Get Capabilities and Stream Configuration procedures.

Figure 7B:
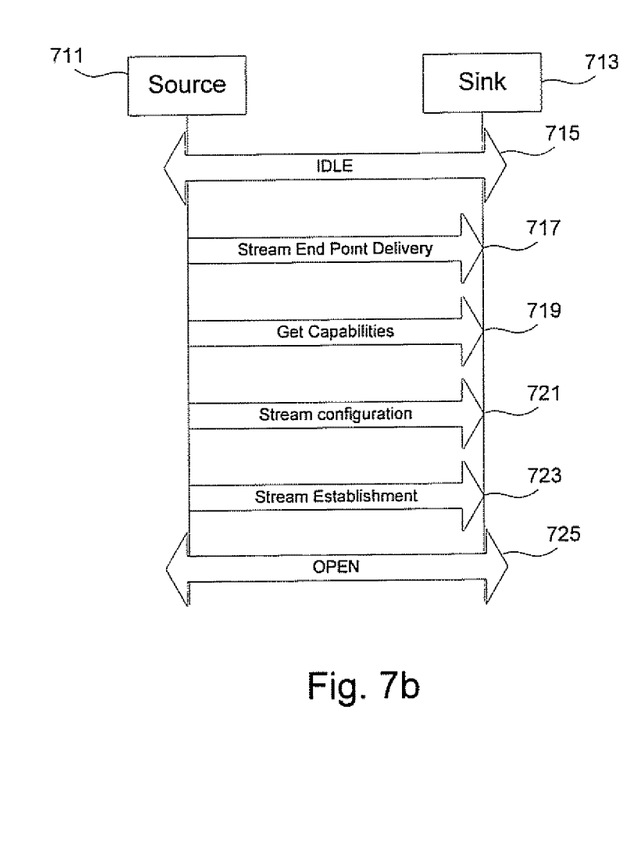
FIG. 7b illustrates an exemplary flow of the audio streaming set up, in accordance with an embodiment of the present invention.

FIG. 7b illustrates an exemplary flow of the audio streaming set up, in accordance with an embodiment of the present invention. Initially, the source device 711 and the sink device 713 may be at an IDLE state 715. The source device 711 may initiate a procedure such as, for example, a Stream Endpoint (SEP) Discovery procedure 717, which may serve to return the media type and stream end-point identification (SEID) for each stream end-point. The Get Capabilities procedure 719 may be initiated to collect service capabilities of the sink device 713. Service capabilities may be, for example, an application service capability or a transport service capability, as described hereinabove. The application service capability for the A2DP may consist of audio codec capability and content protection capability. Based on the collected SEP information and service capability, the source device 711 may determine the most suitable audio streaming parameters (codec, content protection, and transport service) for the sink device 713 and for the source device 711 itself. The source device 711 may then request the sink device 713 to configure the audio parameters of the sink device using the Stream Configuration procedure 721, which may indicate to both the source device 711 and sink device 713 the mapping of the local and remote SEP by indicating the corresponding pair of local and remote SEIDs. Additionally, as a result of the Stream Configuration procedure, there exists a relationship between corresponding steam end-points in each of the source device 711 and sink device 713. The source device may also configure its own audio parameters. The channels may then be established by a Stream Establishment procedure 723, for example. At that point, the states of both devices 711 and 713 may be OPEN 725.

Figure 7C:
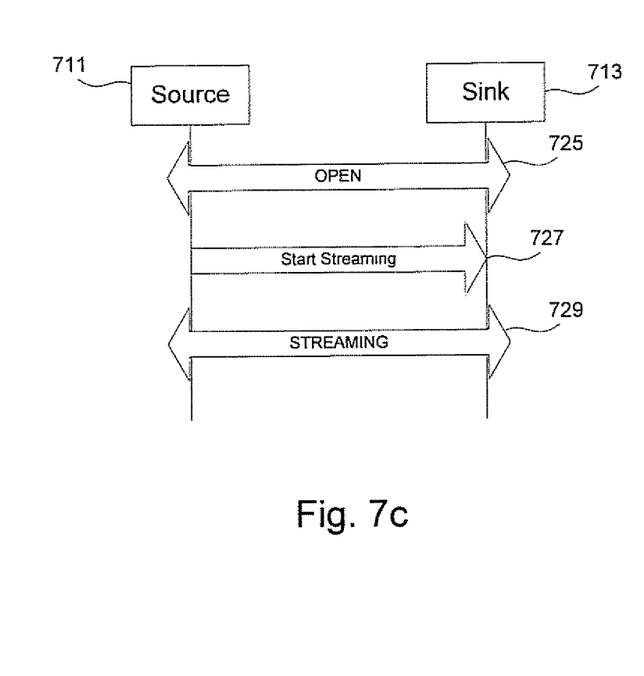
FIG. 7c illustrates exemplary audio streaming, in accordance with an embodiment of the present invention.

FIG. 7c illustrates exemplary audio streaming, in accordance with an embodiment of the present invention. Once the channels are established between the source device 711 and the sink device 713, and the state of the devices is OPEN 725. The source device 711 may initiate a start streaming procedure 727 by a user initiated action or an internal event. The states of both device 711 and 713 may then change to STREAMING 729, Once the start streaming procedure 727 is completed, audio streaming may start.

During the audio streaming process between the source and the sink devices, the procedures that may be utilized to achieve streaming of the audio data may utilize a Security Control procedure, which may be defined for content protection, and may vary depending on the content protection method used.

Figure 8:
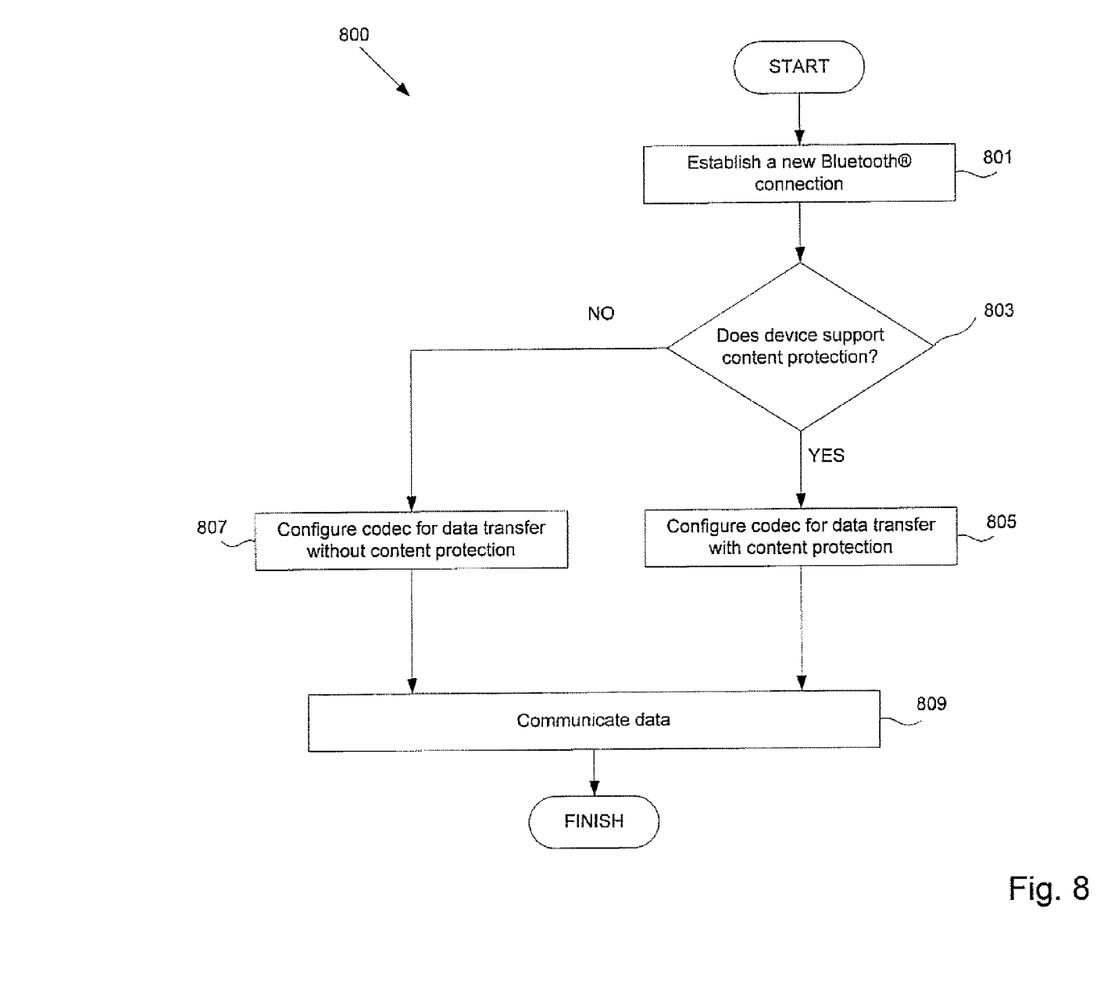
FIG. 8 illustrates a flow diagram of an exemplary method for establishing communication between two devices based on content protection capabilities, in accordance with an embodiment of the present invention.

FIG. 8 illustrates a flow diagram of an exemplary method for establishing communication between two devices based on content protection capabilities, in accordance with an embodiment of the present invention. At 801 a new Bluetooth® connection may be established between two devices such as, for example, devices 701 and 703 of FIG. 7, where one of the devices, for example, device A supports content protection. At 803 it may be determined whether the other device, for example, device B supports content protection. If device B supports content protection, then at 805 the codec in device A may be configured for data communication utilizing content protection, and at 809 the communication may occur between the two devices. If device B does not support content protection, then at 807 the codec in device A may be configured for data communication without content protection, and at 809 the communication between the two devices may occur.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   establishing a Bluetooth communication link between a first device and a second device;
   configuring said first device to enable data communication with said second device based on said first device determining whether said second device supports said data communication with content protection;
   communicating content protected data between said first device and said second device based on said configuring; and
   based on said first device determining that said second device does not support said data communication with said content protection, configuring said first device to utilize a communication protocol that does not require said content protection, wherein said data communication between said first device and said second device occurs via said established Bluetooth communication link.

2. The method according to claim 1, comprising determining whether said second device supports said data communication with said content protection via said established Bluetooth communication link.

3. The method according to claim 1, comprising, based on said first device determining that said second device supports said data communication with said content protection, configuring said first device to utilize a communication protocol that utilizes said content protection.

4. The method according to claim 1, comprising configuring said first device with one or more communication parameters utilized for said data communication with said second device.

5. The method according to claim 4, wherein said one or more communication parameters comprise at least one of stream rate, mode, signal sampling, or amplitude parameters.

6. The method according to claim 1, comprising, if communication between said first device and said second device fails while utilizing said data communication with said content protection, configuring one or both of said first device and said second device to utilize a communication protocol that does not require said content protection.

7. A non-transitory computer-readable medium having stored thereon a computer program having at least one code section for communication, said at least one code section being executable by a computer for causing said computer to perform steps comprising:

establishing a Bluetooth communication link between a first device and a second device;

configuring said first device to enable data communication with said second device based on said first device determining whether said second device supports said data communication with content protection;

communicating content protected data between said first device and said second device based on said configuring; and based on said first device determining that said second device does not support said data communication with said content protection, configuring said first device to utilize a communication protocol that does not require said content protection, wherein said data communication between said first device and said second device occurs via said established Bluetooth communication link.

8. The non-transitory computer-readable medium according to claim 7, wherein said steps further comprise determining whether said second device supports said data communication with said content protection via said established Bluetooth communication link.

9. The non-transitory computer-readable medium according to claim 7, wherein said steps further comprise, based on said first device determining that said second device supports said data communication with said content protection, configuring said first device to utilize a communication protocol that utilizes said content protection.

10. The non-transitory computer-readable medium according to claim 7, wherein said steps further comprise configuring said first device with one or more communication parameters utilized for said data communication with said second device.

11. The non-transitory computer-readable medium according to claim 10, wherein said one or more communication parameters comprise at least one of stream rate, mode, signal sampling, or amplitude parameters.

12. The non-transitory computer-readable medium according to claim 7, wherein said steps further comprise configuring one or both of said first device and said second device to utilize a communication protocol that does not require said content protection, if communication between said first device and said second device fails while utilizing said data communication with said content protection.

13. A system for communication, the system comprising:
one or more circuits for use in a first device, wherein said one or more circuits is operable to establish a Bluetooth communication link between a first device and a second device;

said one or more circuits is operable to configure said first device to enable data communication with said second device based on said first device determining whether said second device supports said data communication with content protection;

said one or more circuits is operable to communicate content protected data between said first device and said second device based on said configuration; and said one or more circuits is operable to, based on said first device determining that said second device does not support said data communication with said content protection, configure said first device to utilize a communication protocol that does not require said content protection, wherein said data communication between said first device and said second device occurs via said established Bluetooth communication link.

14. The system according to claim 13, wherein said one or more circuits is operable to determine whether said second device supports said data communication with said content protection via said established Bluetooth communication link.

15. The system according to claim 13, wherein said one or more circuits is operable to, based on said first device determining that said second device supports said data communication with said content protection, configure said first device to utilize a communication protocol that utilizes said content protection.

16. The system according to claim 13, wherein said one or more circuits is operable to configure said first device with one or more communication parameters utilized for said data communication with said second device.

17. The system according to claim 16, wherein said one or more communication parameters comprise at least one of stream rate, mode, signal sampling, or amplitude parameters.

18. The system according to claim 13, wherein said one or more circuits is operable to configure one or both of said first device and said second device to utilize a communication protocol that does not require said content protection, if communication between said first device and said second device fails while utilizing said data communication with said content protection.

* * * * *